UNITED STATES PATENT OFFICE.

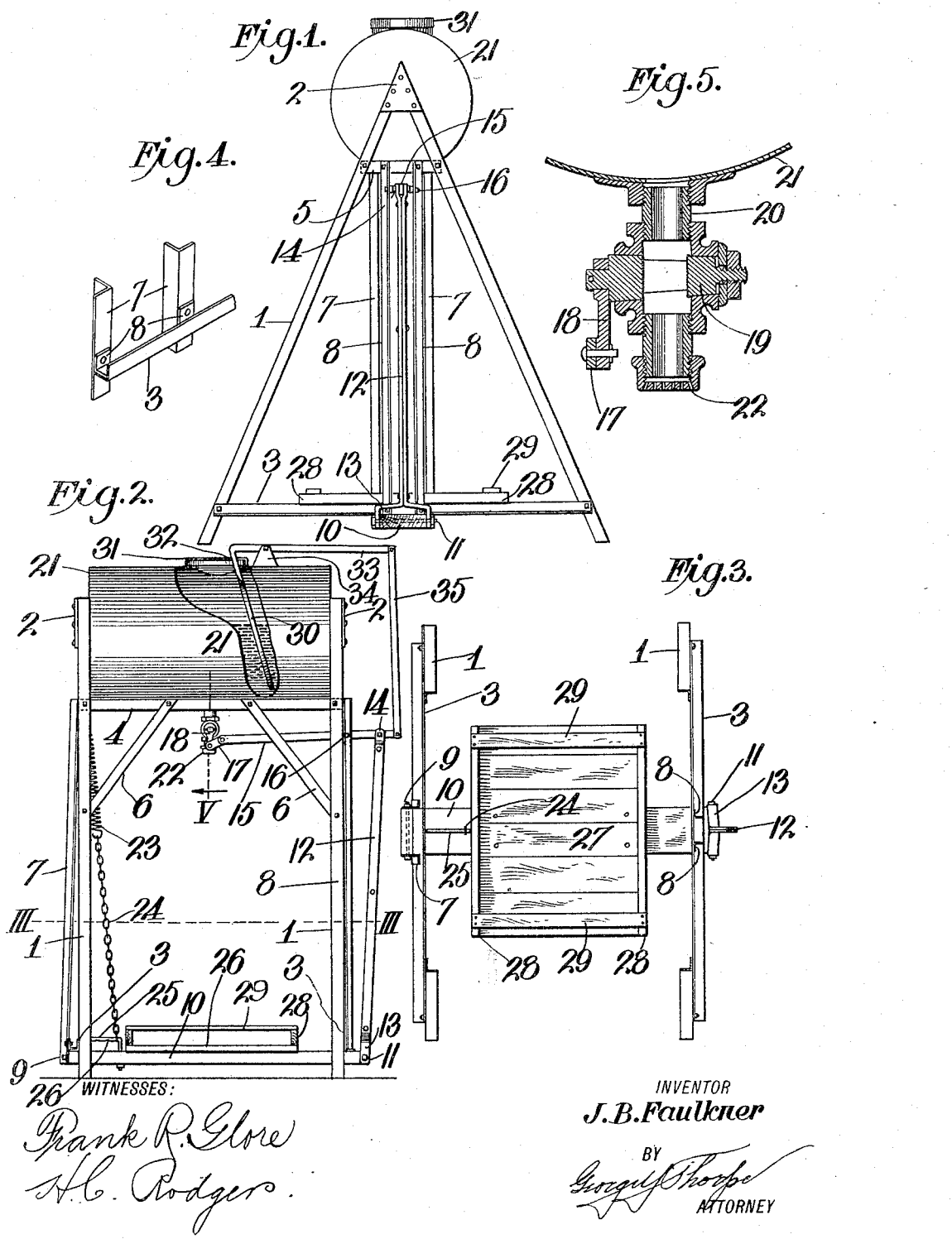

JOHN B. FAULKNER, OF KEARNEY TOWNSHIP, CLAY COUNTY, MISSOURI.

STOCK-SPRAYING APPLIANCE.

1,202,982.   Specification of Letters Patent.   Patented Oct. 31, 1916.

Application filed December 18, 1914.   Serial No. 877,981.

*To all whom it may concern:*

Be it known that I, JOHN B. FAULKNER, a citizen of the United States, residing in Kearney township, in the county of Clay and State of Missouri, have invented certain new and useful Improvements in Stock-Spraying Appliances, of which the following is a specification.

This invention relates to stock spraying appliances and my object is to produce a simple, cheap, strong, durable and efficient appliance for automatically spraying or sprinkling oil or other liquid on stock, particularly hogs.

A further object is to produce an appliance for actuation by each hog in its passage between a feed lot and pasture, for example.

With these general objects in view the invention consists in certain novel and peculiar features of construction and organization as hereinafter described and claimed; and in order that it may be fully understood reference is to be had to the accompanying drawing, in which—

Figure 1, is a side view of a hog oiling appliance embodying my invention. Fig. 2, is a face view of the appliance, equipped with agitating means, omitted from Fig. 1. Fig. 3, is a horizontal section on the line III—III of Fig. 2. Fig. 4, is a fragmentary perspective view to illustrate parts not clearly shown in the other figures. Fig. 5, is an enlarged section taken on the dotted line V of Fig. 2.

In the said drawing a pair of inverted V-shaped vertical frames or standards each consists of upwardly converging bars 1 connected at their upper ends by a plate 2 and near their lower ends by a cross bar 3. The two frames are connected together near their upper ends by a horizontal rectangular frame comprising parallel bars 4 connected at their ends by shorter bars 5, and said horizontal frame is braced by inclined braces 6, secured to the bars 4 and to the bars 1.

At opposite sides upright bars 7 and 8 are secured at their upper ends to bars 5, the lower ends of bars 8 being secured to the cross bar 3 at the corresponding side. The bars 7 extend slightly below the plane of the adjacent cross bar 3 and are connected at their lower ends by a pivot 9 for a cross lever 10 which underlies both bars 3.

At its opposite end the lever 10 carries a pivot 11 to which is attached the lower end of a link 12, which link preferably consists of a pair of bars secured together, the bars being bowed outwardly to form a fork 13 at their lower ends to receive the lever 10 and bowed outward slightly at their upper ends to receive between them on the pivot bolt 14, the outer end of a lever 15 fulcrumed at 16 on the bars 8, and terminating almost centrally below the rectangular frame.

The inner end of lever 15 is connected by a short link 17 to the crank arm 18 of a valve 19 controlling a vertically pendent discharge pipe 20 of an oil tank 21 resting upon the upper ends of the said frames or standards, and the lower end of the discharge pipe 20 is equipped with a perforated cap or spray nozzle 22 disposed vertically above the center of the lever 10.

For normally holding the valve in closed position, a retractile connection is arranged between a fixed point on the framework, near the upper end thereof by preference, and the lever 10, said connection comprising a retractile spring 23, a flexible connection 24 depending from the spring, and a loop 25 secured to the lever near its fulcrumed end, the attachment of the flexible connection to the loop being adjustable by reason of notches 26 in the latter for varying the tension of the spring.

Mounted upon the lever vertically below the spraying nozzle is a runway or platform 27, over which the hogs must pass in going from the feed lot to the pasture or vice versa, or to a drinking fountain. The platform preferably has side boards 28 for supporting in a slightly elevated position the cross strips 29, these cross strips being desirable as tending to check the hogs in their passage over the platform so that they will be properly sprayed with oil from the nozzle 22, it being understood that as the hog steps on the platform, the latter depresses lever 10, to effect the opening of the valve 19, it being understood that in this action the free end of the lever will rest upon the ground so that the weight of the hog shall be imposed only on the lever and the bars 7 and fulcrum or pivot 9, and not be imposed in any way on the valve mechanism or discharge pipe of the tank. The spraying operation ceases the instant the hog's weight is removed from the platform 27, in his passage thereover.

The parts will be so proportioned that two hogs cannot pass over the platform at the same time, and because of the strips 29, it is almost invariable that the sprayed hog jumps off the platform before the following hog steps thereon and hence there is no discharge of oil except when the platform is depressed, because of this the appliance operates very economically.

It will be understood that the oil is sprayed on top of the hog from head to tail and that it flows down over his sides and that when he rolls or wallows or scratches he aids in a thorough and complete distribution of the oil over his entire body.

For using what is known as stock dip or any other liquid susceptible of settling, I prefer to provide means for agitating the liquid, such means to be operated each time the platform is depressed and raised. This agitating means I have shown only in Fig. 2, and it consists of a paddle 30, extending down into the tank through a slot 32 in the cap 31, of the tank. The paddle has an arm 33, overlying the tank and pivoted at an intermediate point to a bracket 34 secured to the tank. The free end of said arm is pivotally connected by a link 35 to the outer end of the lever 15. By this arrangement for agitating or stirring the dip or other liquid at frequent intervals, the quality or richness of the dip will be fairly evenly distributed not only within the tank but over the hogs which will pass through the frame at short intervals, especially during the feeding hours.

The appliance has been used in practice and has operated most efficiently.

It will be understood that the appliance may be modified in various particulars without departing from the principle of construction involved and that I therefore reserve the right to make all changes which fall within the spirit and scope of the appended claims.

I claim:

1. A stock spraying appliance, comprising a framework through which stock is adapted to pass, a liquid container mounted on said framework, provided with a nozzle, a valve controlling said nozzle, a lever connected to open and close said valve, an agitator within the tank, a pivoted arm carrying the same, a link connecting said arm with the said lever, a yieldingly-elevated platform and a link pivotally connecting said platform with the valve operating and agitator operating mechanism.

2. A stock spraying appliance, comprising a liquid holder, means for discharging oil from the holder, a valve controlling such discharge means, a yieldingly-elevated platform adapted to be depressed by a hog in passing thereover, elevated strips at opposite ends of the platform to check the hog in his passage over the platform, and means whereby the depression of the platform shall effect the opening of the valve.

In testimony whereof, I affix my signature, in the presence of two witnesses.

JOHN B. FAULKNER.

Witnesses:
H. C. RODGERS,
G. Y. THORPE.

Copies of this patent may be obtained for five cents each, by addressing the "Commissioner of Patents, Washington, D. C."